(12) United States Patent
Genschow et al.

(10) Patent No.: US 8,339,169 B2
(45) Date of Patent: Dec. 25, 2012

(54) DEVICE FOR CAPTURING AND TRANSFERRING A MEASURED VALUE, SERIES CONNECTION, SYSTEM FOR CAPTURING AND TRANSFERRING MEASURED VALUES, AND HOUSEHOLD APPLIANCE

(75) Inventors: Dieter Genschow, Berlin (DE); Olaf Krause, Neuruppin (DE)

(73) Assignee: PRETTL Home Appliance Solutions GmbH, Neuruppin (DE)

( * ) Notice: Subject to any disclaimer, the term of this patent is extended or adjusted under 35 U.S.C. 154(b) by 0 days.

(21) Appl. No.: 13/328,699

(22) Filed: Dec. 16, 2011

(65) Prior Publication Data

US 2012/0212274 A1   Aug. 23, 2012

Related U.S. Application Data

(63) Continuation of application No. PCT/EP2010/058458, filed on Jun. 16, 2010.

(30) Foreign Application Priority Data

Jun. 16, 2009   (DE) .......................... 10 2009 025 396

(51) Int. Cl.
  *H03K 3/017*   (2006.01)
(52) U.S. Cl. .......................... 327/172; 327/176; 327/298
(58) Field of Classification Search .................. None
  See application file for complete search history.

(56) References Cited

U.S. PATENT DOCUMENTS

| 5,937,023 A | 8/1999 | Wu |
| 6,710,629 B2 | 3/2004 | Lee |
| 2007/0152709 A1 | 7/2007 | Gerhart |

FOREIGN PATENT DOCUMENTS

EP   0412618 A2   8/1990

OTHER PUBLICATIONS

PCT Application No. PCT/EP2010/058458, International Search Report and Written Opinion dated Mar. 24, 2011 (English Translation).
PCT Application No. PCT/EP2010/058458, International Preliminary Report on Patentability dated Dec. 29, 2011 (English Translation).

*Primary Examiner* — An Luu
(74) *Attorney, Agent, or Firm* — Larry E. Henneman, Jr.; Henneman & Associates, PLC

(57) ABSTRACT

A device includes a logic circuit having first, second, and third input ports, a first output port, and a feedback path between the first output port and the third input port. In a first operating state, a logic state change at the first input port triggers a logic state change at the first output port, but a logic state change at the third input port does not trigger a logic state change at the first output port. This allows signals to be routed through the device. In a second operating state, a logic state change of the third input port triggers a logic state change of the first output port. This change is fed back, delayed by a time value, to the third input to maintain an oscillation with at least two edges. The frequency of this oscillation is used to determine a value of a measurement variable.

16 Claims, 5 Drawing Sheets

T=t0

T=t1

T=t2=t1+v

T=t3=t1+v+v

T=t4

DEVICE FOR CAPTURING AND TRANSFERRING A MEASURED VALUE, SERIES CONNECTION, SYSTEM FOR CAPTURING AND TRANSFERRING MEASURED VALUES, AND HOUSEHOLD APPLIANCE

CROSS REFERENCES TO RELATED APPLICATIONS

This application is a continuation of international patent application PCT/EP2010/058458, filed on Jun. 16, 2010 designating the U.S., which international patent application has been published in German language and claims priority from German patent application DE 10 2009 025 396.3, filed on Jun. 16, 2009. The entire contents of these priority applications are incorporated herein by reference.

BACKGROUND OF THE INVENTION

The present invention relates to a device for capturing and transferring a measured value, in particular a measured value which indicates an approach or touch related to at least one sensor element.

The present invention also relates to a series connection of at least a first and a second device as mentioned before.

Even further, the present invention relates to a system for capturing and transferring measured values, in particular measured values which indicate an approach or a touch related to sensor elements.

Still further, the present invention relates to a household appliance comprising a device as mentioned before or a series connection as mentioned before or a system as mentioned before.

Today's technical devices comprise a plurality of sensors, detectors, switches, buttons, etc. Querying and evaluating these elements becomes more difficult and more expensive as a number of such elements increases and presents a notable expense factor, in particular for household devices or for input devices in an automobile.

One idea is to use a central control device to which all sensors, detectors, switches, buttons, etc. are directly connected. Such an arrangement can be provided rather easily. However, it has the drawback that as the distance between the control device and an individual element increases, longer cabling or wiring becomes necessary. If a plurality of elements is at a distance from the control device, the amount of the required wiring is multiplied.

Another idea is to use a bus system, typically a bus system with a ring architecture where all elements are connected to the nearest coupling point into the bus system. This allows to significantly reduce the total amount of wiring. However, the drawback is that the implementation of a bus system is a significant expense factor on its own. In addition, both ideas require additional efforts in order to capture the measured values, provide them to the control device and evaluate them at the control device.

It is an object of the present invention to provide an improved device for capturing and transferring a measured value.

It is a further object of the present invention to provide an improved series connection of devices as mentioned before.

Even further, it is an object of the present invention to provide an improved system for capturing and transferring measured values.

Still further, it is an object of the present invention to provide an improved household appliance.

SUMMARY OF THE INVENTION

According to a first aspect of the present invention there is provided a device comprising
a logic circuit having a first input port, a second input port, a third input port and a first output port, and
a feedback path which provides a connection between the first output port and the third input port and which is configured to feed back a change in the state of the first output port to the third input port delayed by a time value,
wherein the feedback path comprises an impedance which is configured to change in response to the measured value and consequently change the time value of the feedback in the feedback path, and
wherein the logic circuit is configured to set a first or a second operating state depending on whether a first or a second logic state is present at the second input port, wherein
in the first operating state a change of a logic state at the first input port triggers a change of a logic state of the first output port and a change of a logic state at the third input port does not trigger a change of the logic state at the first output port, and
in the second operating state a change in the logic state of the third input port triggers a change of the logic state of the first output port.

Such device allows to obtain a number of advantages with only some of them being explained in the following.

One way to view the functionality is that an information signal at the input of the device can be routed to the output of the device if the second input port is in a constant state, in particular when the second element has been switched passive. On the other hand, if the second element is active and the state at the first input port is constant, the signal from the feedback path can be routed to the first output.

Since the device offers the functionality to route a signal from its input to its output as well as providing a signal to the output which has been generated within the device, it does not require notable efforts to arrange multiple devices in series, with practically no limit to the number of devices.

In the context of capturing a logic state it is advantageous to use thresholds. When considering a scale from 0% to 100% of all levels/values which can be present at an input port, wherein 0% represents the minimum value and 100% represents the maximum value, it is advantageous if the threshold for one of the logic states, in particular "1", is above 50%, preferably above 70% and even more preferably above 90%. Alternatively or in addition the threshold for the other logic state, in particular "0", is below 50%, preferably below 30% and even more preferably below 10%. This allows to stabilize the performance of the feedback path. In particular, the time value, which may also be referred to as a time constant, of the feedback path can be increased, so that the changes in state of the second output port occur more slowly and can thus be detected more easily.

In this context it is pointed out that the differentiation between "first" and "second" state is applied in order to distinguish between two different states. The skilled artisan will appreciate that the choice of whether the first state is "0" and the second state is "1" or whether the first state is "1" and the second state is "0" will depend on the specific implementation. Such states relate to a particular element. This means that a first state of one element does not necessarily have to match a first state of another element.

The present invention even allows to process logic states with a plurality of bits, e.g. two bits having the states "00", "01", "10" and "11" or three bits having the states "000", "001", "010", "011", "100", "101", "110" and "111". Still, using logic states "0" and "1" allows for a simple and reliable design of the device, since the logic states can be easily distinguished from one another. Depending on the choice of terminology, the states can also be described as "high" or "low". These logic states are digital values which are represented by analog voltages. It may be preferred that only states "0" and "1" can be present at the output port, since this allows for an easy distinction of these states.

In some embodiments it may be preferred that the logic state "1" is represented by a voltage greater than 2.5 V, preferably greater than 5 V and even more preferably greater than 10 V and that the logic state "0" is represented by a value which is less than 50% of the value for logic state "1", preferably less than 25% and even more preferably less than 10%. Further, it may be preferred that the logic state "0" is represented by a voltage of approximately 0 V.

The impedance in the feedback path can be provided in a number of different ways. It may comprise resistive and/or capacitive and/or inductive characteristics, may be arranged in series in the feedback path or may be connected to the feedback path against another voltage potential, preferably against ground. Other combinations of elements and connecting arrangements are possible as well.

The impedance has the functionality in that it assumes difference impedance values for different values of the measured value and thus provides different time values or time constants in the feedback path. This allows to relate the time value or time constant to the measured value that is to be captured.

The functionality of the feedback path is now described in more general terms, a more detailed description provided in the context of the preferred embodiments. A change in state of the second output port is provided to the third input port delayed by a time value. When the change in state occurs at the third input port, such results again in a change in state of the second output port. This change in state, again, is provided to the third input port delayed by a time value. If the second element is active the changes in state of the second output port and of the third input port are such that a change in state of the third input port triggers such a change in state of the second output port that this triggers again—delayed by a time value—a change in state of the third input port, and so on.

In order to capture the measured value from the frequency which will occur at the second output port, and then at the first output port and at the output of the device, the following approaches may be chosen in preferred embodiments. On the one hand it is possible to specify a mathematical relation between the measured value and the frequency due to the laws of physics. Then, once a certain frequency is captured, the corresponding value of the measurement variable can be captured. On the other hand, based on practical experiments it can be captured which frequencies represent which corresponding measured values. The corresponding relationships are preferably stored in a look-up table and can then be easily queried.

The time value or time constant for the feedback of the feedback path is preferably between 10 ns and 100 ms, more preferably between 1 µs and 10 ms and even more preferably between 10 µs and 1 ms.

The provided device may preferably be used in the following applications:

Proximity sensor, capacitive principle
Resistance strain gauge, resistive principle
Moisture sensor, capacitive principle
Light detector, differential-resistive principle
Temperature sensor, differential-resistive principle
Coil, inductive principle
Switch or button, resistive principle (ON/OFF)

One advantage of the device according to the present invention lies in the trans-formation of a measured value into a frequency. The following example may serve to illustrate this advantage. A light sensor which is to provide measured values at night as well as in bright sunshine, provides measured values in the range of 0.01 lux and 100,000 lux. In order to represent this signal, in particular using a voltage, without distortion and without losses at a good resolution, e.g. 0.01 lux, a very sophisticated measurement circuitry is required. If the signal is to be digitized in a further step, this leads to additional circuitry. When transforming the signal into a frequency, the desired resolution can be obtained with reduced efforts. Since a common microcontroller can capture a frequency with a good accuracy, e.g. with a resolution of 0.001 Hz, a frequency range of 0.01 Hz to 100 kHz can be easily processed.

The wording used in the context of explaining the present invention that a change in a logic state of an input port triggers a change in a logic state of an output port, indicates that over time a series of edges, two or more, at the input port is presented over time as a series of edges, two or more, at the output port. It is not required that the signals are identical. Rather, in preferred embodiments, the signals may be inverted or delayed in time. Rather, it is required that the series of edges over time at the output port allows to make a determination regarding the measured value. In other words, as long as a certain frequency for the series of edges can be related to a measured value, the feature is fulfilled that a change in a logic state of an input port triggers a change in a logic state of an output port.

According to a refinement of the present invention the logic circuitry comprises:
   a first digital element comprising the first input port, the first output port and a fourth input port, wherein the first element is configured to change the state of the first output port upon a change in state of the first or the fourth input port,
   a second digital element comprising the second and the third input port and a second output port, wherein the second digital element is configured to trigger a change in the logic state of the second output port upon a change in the logic state of the third input port, given that a first logic state is present at the second input port, and is configured to maintain the logic state at the second output port constant even if the logic state of the third input port changes, given that a second logic state is present at the second input port, wherein the second logic state is different from the first logic state,
   wherein the second output port is logically connected to the fourth input port such that a change in the logic state of the second output port leads to a change in the logic state of the third input port.

The functionality of the first element is to change the state at the first output port if the state of either the first or the fourth input port changes. This means that the state of the first output port changes only when either the state at the first input port or the state at the fourth input port changes. However, there is no change, if both states change at the same time.

Such a first element may offer the benefit that it is transparent to changes of the first input port when the state of the fourth input port is constant and that it is transparent to changes of the fourth input port when the state of the fourth input port is constant. The wording "transparent" is understood in the sense that a change in the logic state of the corresponding input port leads to a change in the logic state of the output port of the element.

More specifically this may mean that a first information signal at the first input port triggers a corresponding information signal at the first output port when the state of the fourth input port is constant. If a second information signal is present at the fourth input port, a corresponding information signal is generated at the first output port when the state of the first input port is constant. Therefore, a first or a second information signal can be switched transparently to the first output port.

It is pointed out that the information signal at the output does not have to be identical to the information signal at the input. For example, the invention may be practiced when the amplitude of information signal at the output differs from the amplitude of the information signal at the input. Also, the information signal at the output may be inverted or delayed in time. In order to practice the invention it is sufficient that the information signal at the output comprises the same temporal sequence of changes in the signal, in particular edges, as the information signal at the input.

The device comprises the first digital element. The wording "digital element" is to convey in the context of the present invention as such elements that have discrete values at their output port, but not arbitrary values. Such elements further have the characteristic that changes in state at the input ports of such element result in changes at the output port only in discrete steps, but not on any for any infinitesimal small change. Such digital elements may comprise, without being limited to, logic elements, microprocessors and memory chips.

Since the device uses digital elements, sources of noise can be more easily filtered than it is the case for analog signals.

The functionality of the second digital element is, in connection with the feedback path, to trigger a signal at the second output port that changes in response to the impedance of the feedback path, in particular in view of the frequency. Further, the second element can be set active or inactive via the second input port. It is advantageous, when arbitrary changes at the third input port do not trigger a change in state at the second output port, unless a first logic state is present at the second input port. Whether this state is chosen as "0" or "1" depends on the particular implementation of the logic.

The capability to set the second element either to active or passive, allows a particular functionality in connection with the first element. If the second element is set passive, the fourth input port of the first element remains in a constant state. This allows to feed an information signal to the first input port of the first element and to provide a corresponding information signal at the first output port without any interference by a signal at the third input port. If the second element is active, an information signal is generated at the second output port, which is then provided to the fourth input port of the first element. Thus, this information signal is provided to the first output port correspondingly if the first input port is in a constant state.

When the second element is active, a continually changing signal is present at the second output port which is routed to the output of the device via the first element. Based on the frequency that underlie the changes in this signal, the value of the measured variable can be obtained in a straight-forward manner.

According to a further refinement of the present invention the first digital element is configured as an XOR-element.

This refinement is cost-efficient and reliable.

According to a further refinement of the present invention the second digital element is configured as an AND-element, wherein the third input port is negated.

This refinement is cost-efficient and reliable as well. This, in particular, in combination with the previously referred to XOR-element.

According to a further refinement of the present invention the impedance comprises a resistive element which is arranged in series in the feedback path and/or which comprises a capacitive element which is connected to the feedback path and connected to ground.

In general it is sufficient that only one element, either a resistive element or a capacitive element, is connected in or to the feedback path. Since the feedback path will always have a certain resistance and a certain capacity, it may be sufficient to have one element in the feedback path which changes the impedance in the feedback path in relation to the measured value. If the feedback path already comprises a resistive or capacitive element which is dependent on the measured value, it may not be necessary to provide a further element.

If, e.g., a conductor is used in the feedback path which resistance and/or capacity changes dependent on the measured value, no additional discrete element has to be provided, since the feedback path already has a time value or a time constant which depends on the measured value. It is pointed out that the impedance may also comprise inductive components or may even consist of an inductance only. Therefore, the impedance may be implemented by any element or component which resistive and/or capacitive and/or inductive portions depend on the measured value.

According to a further refinement of the present invention, a hysteresis element is arranged before the third input port or at the third input port, or the third input port is provided with hysteresis characteristics.

This refinement allows to easily set the range of the variability of the time value in the feedback path. This will mean, in general, that the time value of the feedback path will increase, the greater the distance is between the upper and the lower switching point of the hysteresis. The hysteresis element is preferably implemented as a Schmitt trigger. It may be particularly advantageous, if the third input port of the second element comprises such Schmitt trigger or if the third input port has the characteristics of a Schmitt trigger.

According to a further refinement of the present invention the device comprises a plurality of impedances, i.e. two or more impedances, which can be selectively switched to the feedback path via a selection element.

This refinement may offer the advantage that a device can capture a plurality of measured values. Each impedance correlates to a particular measurement variable. Then, if the measured value of a particular measurement variable is to be captured, the corresponding impedance is switched to the feedback path via the selection element. The measured value is then captured according to the procedure explained above. If another measurement variable is to be captured, the other corresponding impedance is switched to the feedback path, and the measurement value of the other measurement variable is captured. In the context of this application the term "switched to" comprises the meanings of "switched to" and "switched into".

A preferred application may be that a plurality of control areas of a control panel are each assigned an impedance. If it is to be captured whether a finger is approaching one of the control areas or whether one of the control areas has been touched or pushed, this can be easily achieved. The individual impedances are individually switched to the feedback path and the corresponding measured values are evaluated. The selection element is preferably configured as a multiplexer.

According to a further refinement of the present invention a drain element is provided at the third input port, the drain element configured to temporarily switch the feedback path against a high resistance or against ground.

This allows a simplified implementation of the device which will further be explained in the context of the preferred embodiments.

According to a further preferred embodiment of the invention, the second element with the feedback path is configured as an oscillator, preferably as a relaxation oscillator.

This refinement allows to easily achieve the assignment between the measured value to the captured and the resulting frequency in the feedback path or of the second output port.

According to a further refinement of the present invention, the impedance comprises an electrode.

This refinement allows for an easy implementation to measure an approach towards a control element which comprises the electrode. If a finger approaches the control element—and thus approaches the electrode—, the capacity of the impedance changes, and a certain time value or time constant is present in the feedback path. Depending on the magnitude of the time value or dependent on the captured frequency in the feedback path it can be captured how close the finger is at the control element. Further, it can be captured whether a touch has taken place, since this results in a significant capacity change.

According to a second aspect of the present invention, a series connection of at least a first and a second device is provided, wherein the devices each correspond to the device as described above, and wherein the output of the first device is electrically connected to the input of the second device.

As already explained, the present device is well-suited for a series connection. A series connection can be implemented easily, since no further elements are required in order to achieve the functionality of the series connection beyond those elements already present in the individual devices. In a preferred embodiment the driving of the devices is done in a coordinated manner, which only activates the second element of one of the devices in the series connection at a time. In particular, it is preferred to connect at least three devices in the series connection.

According to a further refinement of the present invention, at least one of the devices of the series connection comprises a plurality of impedances which can be selectively switched to the feedback path via a selection element.

A corresponding preferred embodiment shows that it is possible, in particular without special technical measures, to connect one or more devices with one impedance in a mixed manner with one or more devices with a plurality of impedances in series.

According to a third aspect of the present invention a system for capturing and transferring of measured values is provided, in particular such measured values which indicate an approach or a touch related to one or more sensor elements, comprising a series connection as described above, and comprising a control device having at least two activation outputs that are individually connected to the respective second input ports of the devices, and comprising a receiving port which is connected to the first output port of the last device in the series connection.

The functionality of such a system will be explained in detail in connection with a preferred embodiment. The system allows to activate a desired second element in one of the devices via the corresponding activation output. Due to the activation an oscillation in the feedback path of the corresponding device takes place which results in an information signal having a particular frequency at the output of the corresponding device. Based on the characteristics of the first element as described above, this information signal is routed through all other devices, which are passive, to the receiving port of the control device. Since the control device has knowledge of which second element has been activated, the control device can capture the measured value of the desired measurement variable based on the frequency of the information signal.

According to a further refinement of the present invention the control device is configured to capture the number of changing edges at the receiving port per unit of time and to thus capture the measured value that is being signalized.

Based on the number of edges per unit of time the frequency of the information at the receiving port can be captured. Since the control device has knowledge what kind of impedance has generated this frequency, the corresponding measured value can be calculated or can be taken from a look-up table.

According to a fourth aspect of the present invention a household appliance is provided, which comprises the device as described above or a series connection as described above or a system as described above, wherein the impedance is at least partially comprised in a sensor element or a button, so that an approach or a touch of the sensor element or an actuation of the button can be detected.

The skilled artisan will appreciate that the previously described features and the features to be described in the following can be used in other combinations than those described above and can be used as isolated features while still staying within the scope and spirit of the present invention.

BRIEF DESCRIPTION OF THE DRAWINGS

Exemplary preferred embodiments of the present invention are shown in the drawings and are further explained in the following. In the drawings.

DESCRIPTION OF PREFERRED EMBODIMENTS

Figure 1:
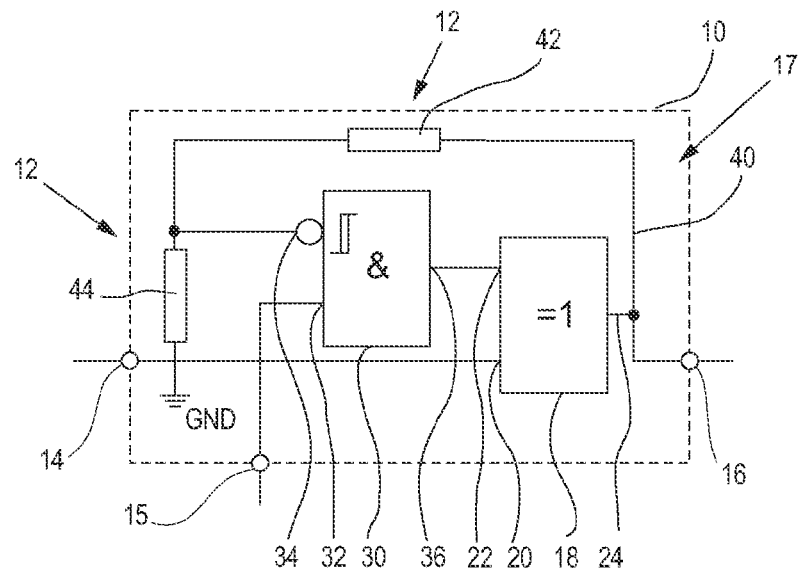
FIG. 1 shows a first embodiment of a device.

FIG. 1 shows a device 10 for capturing and transferring a measured value, in particular a measured value which indicates an approach or a touch related to at least one sensor element. The device comprises an input 14, an activation input 15, an output 16 and a logic circuitry 17.

The device 10 has a first digital element 18 having a first input port 20, a fourth input port 22 and a first output port 24. The first element 18 is configured to change the state of the first output port 24 upon a change in state at the first or at the fourth input port 20, 22. As shown, the first element 18 is preferably configured as an XOR-element. The transfer function of the first element 18 is chosen as follows:

| First input port 20 | Fourth input port 22 | First output port 24 |
|---|---|---|
| 0 | 0 | 0 |
| 0 | 1 | 1 |
| 1 | 0 | 1 |
| 1 | 1 | 0 |

The first input port 20 is electrically connected to the input 14, and the first output port 24 is electrically connected to the output 16.

The device 10 further comprises a second digital element 30 having a second input port 32, a third input port 34 and a second output port 36. The second element 30 is configured to route—if a second logic state is present at the second input port 32—changes in the logic state of the third input port 34 into changes of the logic state of the second output port 36.

Further, the second element 30 is configured such that—if a first logic state is present at the second input port 32—a change in the logic state of the first input port 20 triggers a change in the logic state at the first output port 24, and a change in the logic state at the third input port 34 does not trigger a change in the logic state of the first output port 24.

The second element 30 is preferably configured as an AND-element, wherein the third input port 34 is negated. The second element 30 as shown here has the following transfer function:

| Second input port 32 | Third input port 34 | Second output port 36 |
|---|---|---|
| 0 | 0 | 0 |
| 0 | 1 | 0 |
| 1 | 0 | 1 |
| 1 | 1 | 0 |

The first output port 24 is connected to output 16. If a measured value is to be captured by the device 10, the signal at input 14 or at the first input port 20 is maintained constant, so that the first element 18 generates a signal at its first output port 24, the signal corresponding to the signal at its fourth input port 22. In other words, the first element 18 is transparent to the signal that is provided at the second output port 36.

The device 10 further comprises a feedback path 40 which provides a connection between the first output port 24 and the third input port 34 and which is configured to feed back a change in the state of the second output port 36 delayed by a time value v to the third input port 34. As will be explained later on, the connection may also be provided between the second output port 36 and the third input port 34 without passing through the first element 18, see FIGS. 7 and 8.

The feedback path 40 comprises an impedance 12 which is configured to change in response to the captured measured value and to thus change the time value v of the feedback in the feedback path 40.

In this embodiment the impedance 12 comprises a resistive element 42 which is arranged in series in the feedback path 40, and comprises a capacitive element 44 which is connected to the feedback path 40 and is connected to ground GND. However, it is pointed out that it is in general sufficient to implement the impedance 12 using a single element as long as the value of the impedance 12 changes when the measured value changes and thus changes the time value v of the feedback in the feedback path 40.

As is indicated by the hysteresis symbol at the second element 30, the third input port 34 is provided with a hysteresis characteristics. This allows a good control of the characteristics of the oscillating circuit comprising the impedance 12. In other embodiments it may be preferred to provide a hysteresis element 46 before (or in) the third input port 34 (see FIG. 2).

The shown embodiment is designed such that the first output port 24 and the second output port 36 can either be in logic state "0" or in logic state "1".

The second element 30 in combination with the feedback path 40 is embodied as an oscillator, preferably as a relaxation oscillator, as will be seen from the following description of the functionality of the device 10.

If a logic "0" is present at the activation input 15, a logic "0" is always output at the second output port 36—regardless of the state at the third input port 34.

The logic "0" which is output at the second output port 36 is fed back to the third input port 34 via the feedback path 40. This results in a stable state, since due to the logic "0" at the second input port 32, a logic "0" is always output at the second output port 36.

The constant logic "0" that is present at the second output port 36 in the idle state is also present at the fourth input port 22 of the first element 18. Therefore, the first element 18 is transparent for an information signal which is present at the first input port 20 and which is routed to the first output port 24. Specifically, an information signal which is present at the input 14 of the device 10 is output via the first element 18 at output 16. As already explained, it is not necessary that the information signal at output 16 is identical to the information signal at input 14. In the context of the present invention it is sufficient that the information signal at output 16 has the same chronological sequence of changes in signal, preferably edges, as the information signal at input 14.

If a logic "1" is applied to the activation input 15, a logic "1" at the second output port 36 results due to the logic "0" at the third input port 34. Since the logic state at the first input port 20 is kept constant, the change at the second output port 36 from "0" to "1" leads to a change at the first output port 24: If a logic "0" is present at the first input port 20, the second input port 24 changes from "0" to "1"; if a logic "1" is present at the first input port 20, the state of the first output port 24 changes from "1" to "0".

At the same time, the logic "0" of the second output port 36 is fed back via the feedback path 40 to the third input port 34 delayed by a time value v. This means that the level at the third input port 34 starts to go down from the logic "1" towards the logic "0". If the voltage at the third input port 34 is understood as a logic "0", the state of the second output port 36 changes from "0" to "1".

The logic "1" at the second output port 36 is almost immediately available at the fourth input port 22 and leads to a further change in state, preferably to an edge, at the first output port 24 and at the output 16. The logic "1" at the first output port 24 is again fed back to the third input port 34 delayed by the time value v. Specifically, the voltage at the third input port 34 is now heading in the direction of the logic "1". If the particular threshold for "1" is exceeded, the second element 30 interprets this in a sense of a logic "1", and a further change in state at the second output port 36 from "1" to "0" takes place.

Dependent on the specific value of the impedance 12 and the corresponding time value v a sequence of signal changes, preferably edges, is generated at the output 16 which convey by their frequency the measured value to be captured.

If the activation input 15 is set again to "0", a logic "0" results at the second output port 32 as well as—potentially delayed—at the third input port 34. Thus, the oscillation in the feedback path 40 stops, and the fourth input port 22 of the first element is in a constant state. This allows again to transmit an information signal from input 14 to output 16.

Figure 2:
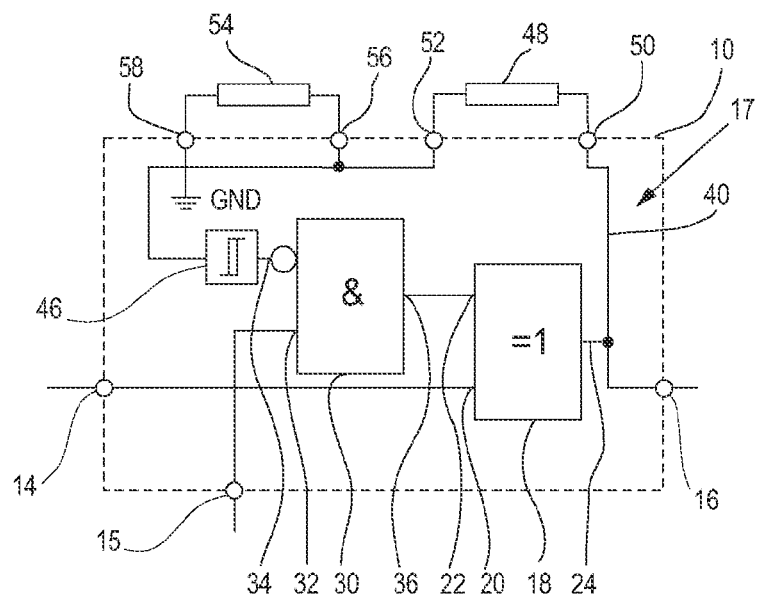
FIG. 2 shows a second embodiment of a device.

FIG. 2 shows a second embodiment of a device 10. The impedance 12 is implemented such that a first impedance portion 48 is connected to connectors 50, 52 and is arranged in series in the feedback path 40. The first impedance portion 48 is preferably configured like the resistive element 42. A second impedance portion 54 is connected to connectors 56, 58 to the feedback path 40 as well as to the ground connector GND. The second impedance portion 54 may be preferably configured like the capacitive element 44.

It can be seen that the impedance 12 can be changed or adapted easily. The first impedance portion 48 as well as the second impedance portion 54 can be omitted, wherein in particular the first impedance portion 48 can be replaced by a flat conductor which naturally provides resistive and capacitive characteristics.

Further, this second embodiment shows, as has been explained above, that a hysteresis element 46 can be arranged before the third input port 34.

Figure 3:
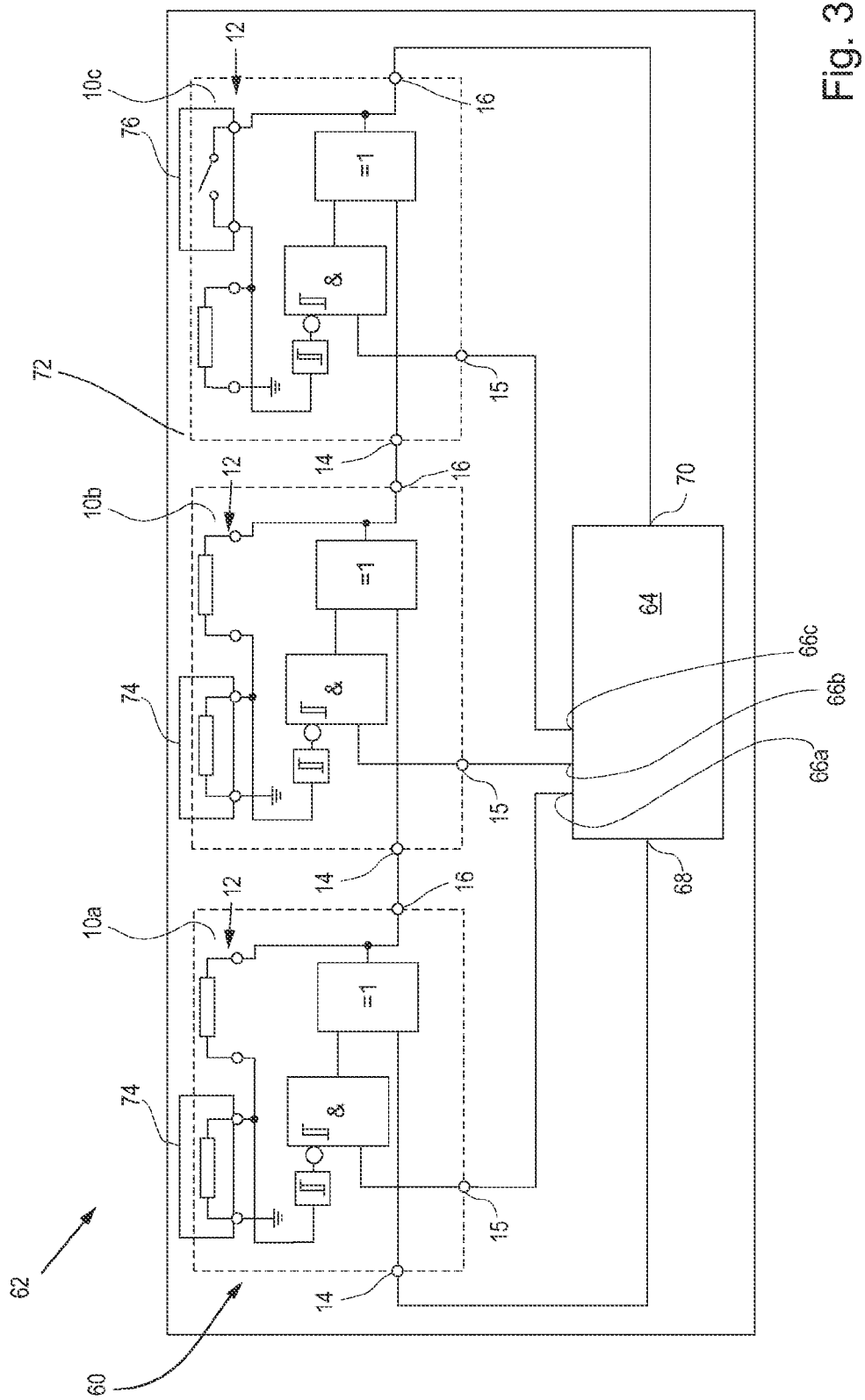
FIG. 3 shows a first embodiment of a system with a series connection according to a first embodiment.

FIG. 3 shows a series connection comprising a first, a second and a third device 10a, 10b, 10c in a system 62 for capturing and transferring of measured values, in particular measured values that indicate an approach or a touch related to sensor elements.

The devices 10a, 10b, 10c are a part of a household appliance 72. The impedances of devices 10a, 10b are each a part of a sensor element 74 and are configured as electrodes. The impedance 12 of the device 10c is a part of a button 76.

The devices 10a, 10b, 10c are of comparable structure, wherein each device 10a, 10b, 10c has a suitable impedance 12. In another embodiment, the impedances 12 may be configured differently and/or may capture different measurement variables. In another embodiment, the devices 10a, 10b, 10c may have different structures, wherein in particular one or more devices 10a, 10b, 10c may be embodied according to a third embodiment (see FIG. 5).

The system 62 comprises a control device 64 which comprises a first, a second and a third activation output 66a, 66b, 66c which are respectively connected with the respective activation input 15 or with a respective second input port 32 of the corresponding device 10a, 10b, 10c.

The control device 64 further comprises a transmission port 68 and a receiving port 70. The transmission port 68 is connected with the input 14 of the first device 10a. The output 16 of the first device 10a is connected to the input 14 of the second device 10b. The output 16 of the second device 10b is connected to the input 14 of the third, i.e. the last, device 10c in the series connection 60. The output 16 of the last device 10c is connected to the receiving port 70 of the control device 64.

If all activation outputs 66a, 66b, 66c are inactive, thus preferably outputting a logic "0", all second elements 30 of the devices 10a, 10b, 10c are passive. This configuration may be used to test the functionality. To achieve this, a test signal is sent from transmission port 68. The signal passes through all devices 10a, 10b, 10c and reaches the receiving port 70. In case the signal received by the receiving port 70 does not correspond to an expected signal, a problem in the system 62, in particular in the series connection 60, may be assumed.

In order to query the measured values at the individual devices 10a, 10b, 10c, the transmission port 68 is set into a constant state, preferably it is set to a logic "0". Then, the control device 64 may activate the first activation output 66a, preferably using a logic "1". Via the activation input 15 and the second input port 32 the second element 30 of the first device 10a is now active.

As explained before, an oscillation starts involving the feedback path 40 of the first device 10a which is output to output 16. Since the second elements 30 of the other devices 10b, 10c are set passive, the information of the signal from the first device 10a is routed through the other devices 10b, 10c and finally reaches the receiving port 70. The control device 64 is configured to capture the number of edges at the receiving port 70 per unit of time and may preferably capture the signalized measured value.

When the measured value of the first device 10a is captured, the first activation output 66a is turned off, preferably set to a logic "0", so that the second element 30 of the first device 10a becomes passive. At output 16 of the first device 10a a constant state is present again. The control device 64 now activates the second activation output 66b, in particular by setting it to a logic "1", so that the process that was just described now occurs in the second device 10b. In the same manner, the measured value from the last device 10c may be captured.

Based on FIGS. 4a to 4e it is explained how a first device 10a works together with a second device 10b. In order to ease the understanding only a few reference numerals are shown. However, the reference numerals continue to apply as they have been introduced in the previous figures.

Figure 4A:
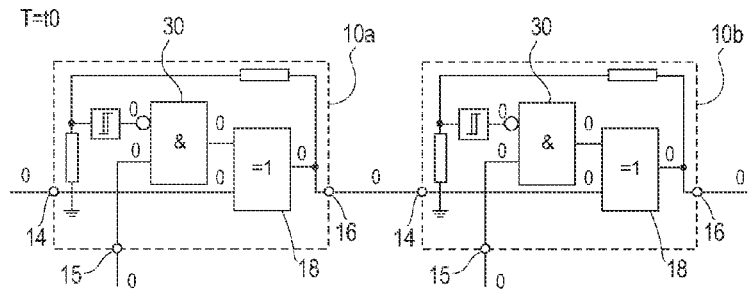
FIG. 4*a* shows a second embodiment of a series connection at a point in time at which both second elements are passive.
Figure 4A:

FIG. 4a shows the idle state in which both second elements 30 are set passive. At all inputs and outputs constant states are present. In this example the output 16 of the second device 10b outputs a logic "0". The course over time of the state of the second output 16 of the second device 10b is shown each time at the right hand side of each of FIGS. 4a to 4e in a small coordinate system, wherein the abscissa shows the time and the ordinate shows the logic state.

Figure 4B:
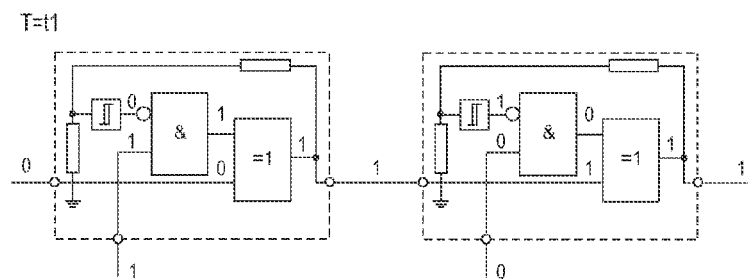
FIG. 4*b* shows the series connection according to FIG. 4*a* at a point in time at which the second element of the first device is set to active.
Figure 4B:
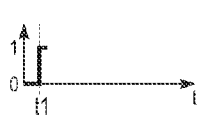

At a point in time t1, see FIG. 4b, the activation input 15 of the first device 10a is activated and the second output port 36 of the first device 10a outputs a logic "1". The result is that the state of the first output port 24 changes from "0" to "1". This again makes the first output port 24 of the second device 10b change from "0" to "1". This change is shown in the diagram. It is to be noted that the state at the third input port 34 of the device 10a does not immediately change, but only after a delay by the time value v.

The time value v depends on the value of impedance 12. Further, it depends on the choice of the lower and upper thresholds. The further the thresholds are apart based on which a "0" or a "1" is detected, the greater becomes v when a constant impedance is assumed.

Figure 4C:
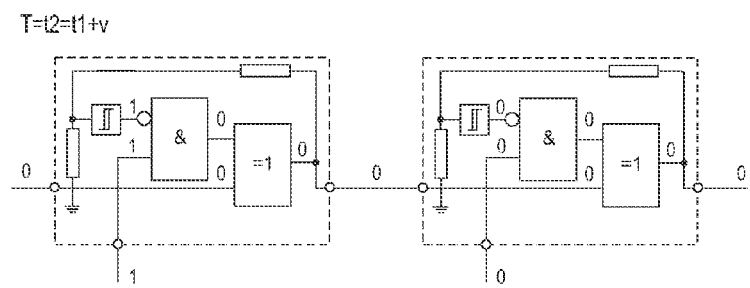
FIG. 4*c* shows the series connection according to FIG. 4*a* at a point in time at which a first change at the third input port of the first device has taken place.
Figure 4C:
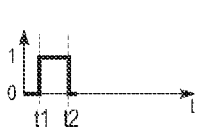

FIG. 4c shows the situation that the state at the third input port 34 is captured as a logic "1" at a point in time t2. This makes the second output port 36 of the first device 10a change from "1" to "0", makes the first output port 24 of the first device 10a change from "1" to "0", and makes the first output port of the second device 10b change from "1" to "0". This is shown in the diagram.

Figure 4D:
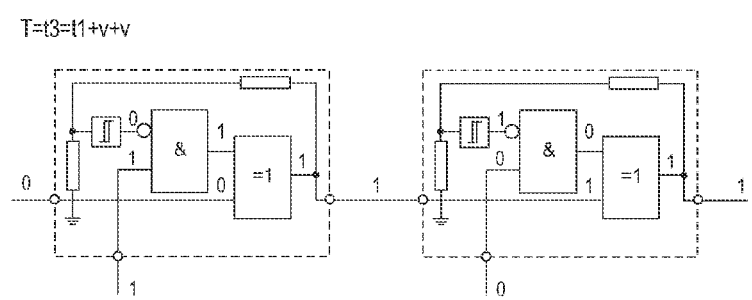
FIG. 4*d* shows the series connection according to FIG. 4*a* at a point in time at which a second change at the third input port of the first device has taken place.
Figure 4D:
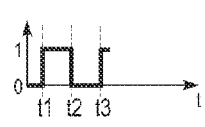

FIG. 4d shows that it takes some time before the logic "0" at the second output port 36 of the first device 10a is visible at the third input port 34 of the first device 10a. When this is the case, the second output port 36 of the first device 10a changes its state again from "0" to "1". This again has the result that the first output port 24 of the first device 10a as well as the first output port 24 of the second device 10b change their state. The result is shown in the diagram.

Figure 4E:
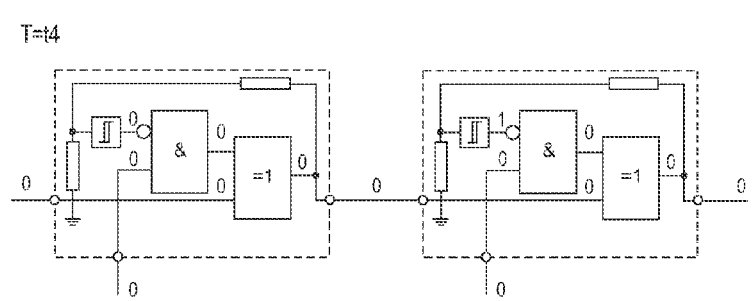
FIG. 4*e* shows the series connection according to FIG. 4*a* at a point in time at which the second element of the first device is set back to passive.
Figure 4E:
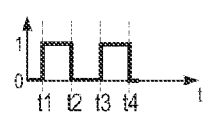

Finally, FIG. 4e shows that the activation input 15 of the first device 10a is again set to "0" and that the second element 30 of the first device 10a becomes passive. Therefore, again an idle state is reached where all inputs 14 and outputs 16 have a constant state.

Figure 5:
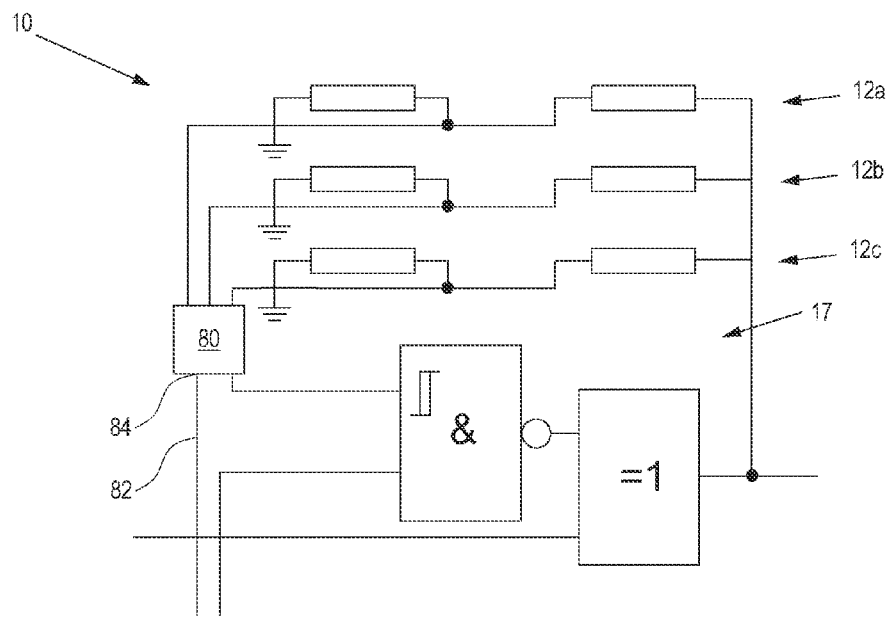
FIG. 5 shows a third embodiment of a device.

FIG. 5 shows a third embodiment of a device 10. The device 10 comprises a plurality of impedances 12a, 12b, 12c which can be selectively switched into the feedback path 40 via a selection element 80. The choice of one of the impedances 12a, 12b, 12c is done via a control line 82 which is connected to a selection port 84 of the selection element 80. If the first impedance 12a is to be switched into the feedback path 40, this is signalized via control line 82.

The selection element 80 which is preferably embodied as a multiplexer connects the first impedance 12a with the third input port 34 and ensures that the other impedances 12b, 12c are not connected to the third input port 34. While there are preferred embodiments where a plurality of impedances 12a, 12b, 12c is connected to the third input port 34 at the same time, it seems more preferable at this time to have only one impedance 12a, 12b, 12c connected to the third input port 34. In this manner, one device 10 allows to capture a plurality of measured values, here three measured values, one after the other.

Figure 6:
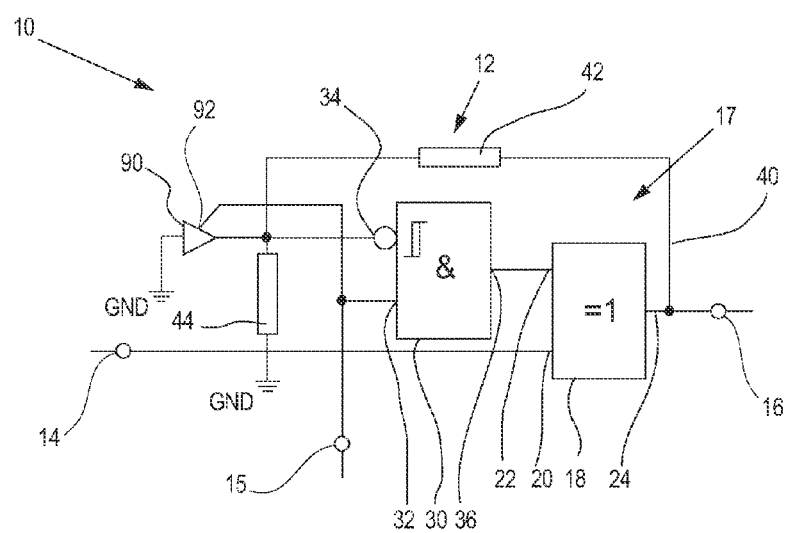
FIG. 6 shows a fourth embodiment of a device.

FIG. 6 shows a fourth preferred embodiment of a device 10. In this embodiment a drain element 90 is arranged at the third input port 34 which is configured to connect the feedback path 40 temporarily against a high impedance or against ground (GND). This embodiment allows a somewhat simplified structure in comparison to the first embodiment according to FIG. 1. When using this embodiment the feedback path 40 can be logically "disconnected" from the third input port 34, which means that a signal in the feedback path 40 does not affect the third input port 34, so that changes in the feedback path 40 cannot trigger a change in the second element 30. It would also be possible to make a physical separation, preferably the drain element 90 being a relay.

The drain element 90 comprises a release input 92 which is connected to the activation input 15. When the release input 92 is activated, in particular using a logic "1" the drain element 90 connects the feedback path 40 with the third input port 34. If the release input 92 is inactive, in particular when a logic "0" is present, the feedback path 40 is separated from the third input port 34, preferably by the drain element 90 assuming high-impedance characteristics. The drain element 90 is preferably embodied as a buffer with tri-state-functionality.

The feedback path 40 is connected to the first output port 24 of the first element 18. As explained above, a change of the second output port 36 leads to a change at the first output port 24 if—this being the working assumption here at this point—a constant state is present at the first input port 20. Therefore, the feedback can be obtained essentially in the same manner as if the feedback path 40 is connected to the second output port 36. Since the drain element 90 separates the feedback path 40 from the third input port 34 if a logic "0" is present at the activation input 15, even a forwarded signal, which leads to changes in state at the first output port 24 cannot trigger an oscillation in the feedback path 40.

Figure 7:
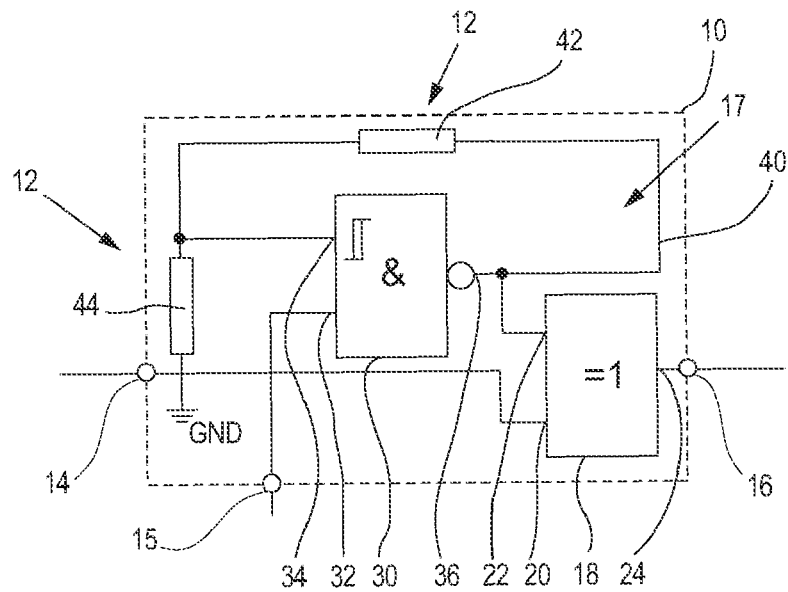
FIG. 7 shows a fifth embodiment of a device.

FIG. 7 shows that the feedback path 40 may alternatively also be connected to the second output port 36. This is possible because—if the first input port 20 is kept constant—a change in the logic state of the first output port 24 is caused by a change in state of the second output port 36. Therefore, the feedback may also occur via the second output port 36. Since the sequence of logic states changes the device 10 has been adapted such that an AND-element with a negated output (NAND-element) is used.

Figure 8:
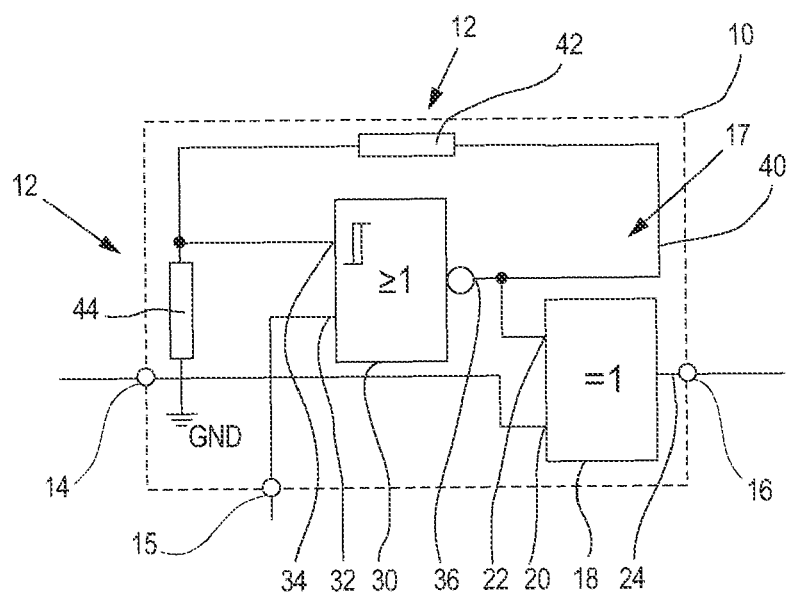
FIG. 8 shows a sixth embodiment of a device.

FIG. 8 shows that the second element 30 may also be configured as a NORelement. In comparison to the previous embodiments the second input port 32 is set to "0" if an oscillation in the device 10 is to occur. If no oscillation is desired the second input port 32 is set to "1".

What is claimed is:

1. A device for capturing and transferring a measured value, the device comprising
   a logic circuit having a first input port, a second input port, a third input port and a first output port, and
   a feedback path which provides a connection between the first output port and the third input port and which is configured to feed back a change in the state of the first output port to the third input port delayed by a time value,
   wherein the feedback path comprises an impedance which is configured to change in response to the measured value and consequently change the time value of the feedback in the feedback path, and
   wherein the logic circuit is configured to set a first or a second operating state depending on whether a first or a second logic state is present at the second input port, wherein
      in the first operating state a change of a logic state at the first input port triggers a change of a logic state of the first output port and a change of a logic state at the third input port does not trigger a change of the logic state at the first output port, and
      in the second operating state a change in the logic state of the third input port triggers a change of the logic state of the first output port.

2. The device according to claim 1, the logic circuitry comprising:
   a first digital element comprising the first input port, the first output port and a fourth input port, wherein the first element is configured to change the state of the first output port upon a change in state in one of the first and fourth input ports,
   a second digital element comprising the second and the third input port and a second output port, wherein the second digital element is configured to trigger a change in the logic state of the second output port upon a change in the logic state of the third input port, given that a first logic state is present at the second input port, and is configured to maintain the logic state at the second output port constant even if the logic state of the third input port changes, given that a second logic state is present at the second input port, wherein the second logic state is different from the first logic state,
   wherein the second output port is logically connected to the fourth input port such that a change in the logic state of the second output port leads to a change in the logic state of the third input port.

3. The device according to claim 2, wherein the first digital element is configured as an XOR-element.

4. The device according to claim 2, wherein the second digital element is configured as an AND-element, and wherein the third input port is negated.

5. The device according to claim 1, wherein the impedance comprises a resistive element which is arranged in series in the feedback path and/or which comprises a capacitive element which is connected to the feedback path and connected to ground.

6. The device according to claim 1, wherein a hysteresis element is arranged before the third input port or at the third input port, or the third input port is provided with hysteresis characteristics.

7. The device according to claim 1, wherein the device comprises a plurality of impedances, which can be selectively switched to the feedback path via a selection element.

8. The device according to claim 1, wherein a drain element is provided at the third input port, the drain element configured to temporarily switch the feedback path against a high resistance or against ground.

9. The device according to claim 1, wherein the second element with the feedback path is configured as an oscillator, preferably as a relaxation oscillator.

10. The device according to claim 1, wherein the impedance comprises an electrode.

11. The device according to claim 1, wherein the feedback path is connected to the second output port instead of the first output port.

12. A series connection of at least a first and a second device each according to claim 1, and wherein the output of the first device is electrically connected to the input of the second device.

13. The series connection according to claim 12, wherein at least one of the first and second devices of the series connection comprises a plurality of impedances which can be selectively switched to the feedback path via a selection element.

14. A system for capturing and transferring of measured values, the system comprising a series connection according to claim 12, comprising a control device having at least a first and a second activation output, the first activation output connected to the second input port of the first device and the second activation output connected to the second input port of the second device, and comprising a receiving port which is connected to the first output port of a last device in the series connection.

15. System according to claim 14, the control device being configured to capture the number of edges at the receiving port per unit of time and to thus capture the measured value that is being signalized.

16. A household appliance comprising the series connection of claim 12, wherein the impedance is at least partially comprised in a sensor element or a button, so that an approach or a touch of the sensor element or an actuation of the button can be detected.

* * * * *